J. B. PIERCE, Jr.
PROCESS OF PRODUCING BARIUM OXID.
APPLICATION FILED MAY 6, 1918.
1,305,618.
Patented June 3, 1919.
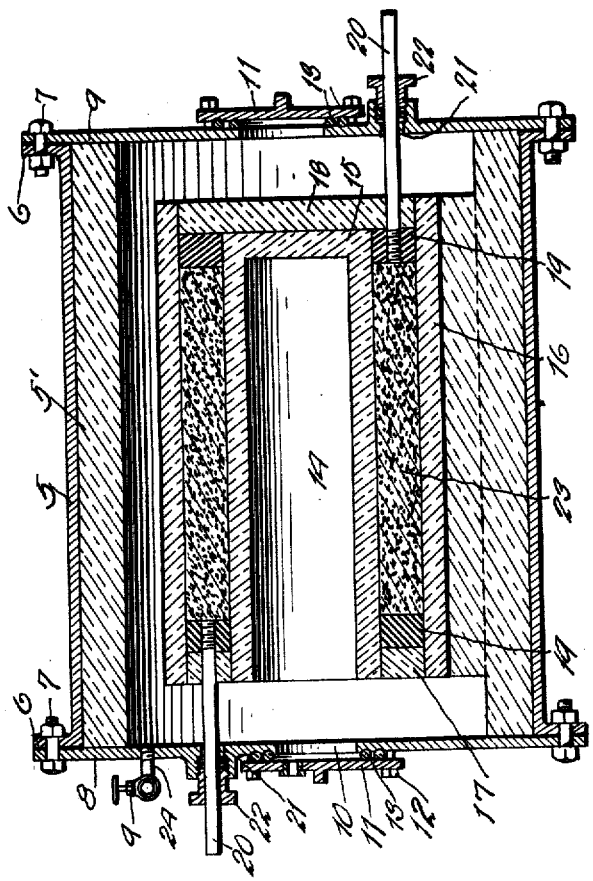
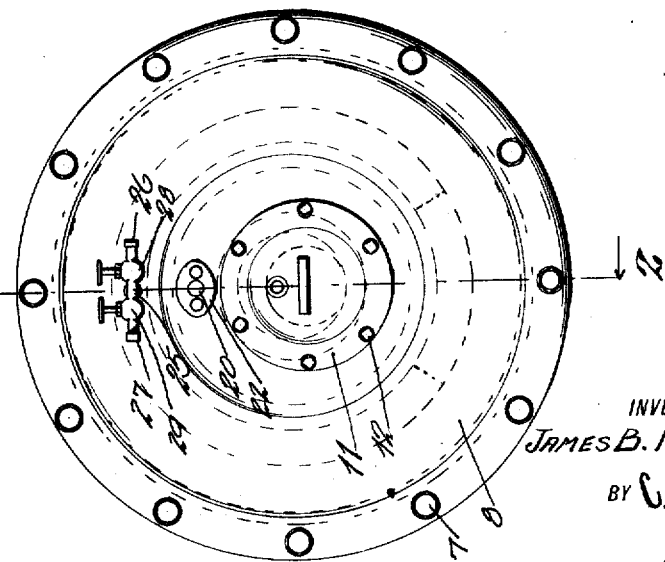
INVENTOR
JAMES B. PIERCE, JR.
BY C. L. Parken
ATTORNEY

UNITED STATES PATENT OFFICE.

JAMES B. PIERCE, JR., OF CHARLESTON, WEST VIRGINIA.

PROCESS OF PRODUCING BARIUM OXID.

1,305,618.  Specification of Letters Patent.  Patented June 3, 1919.

Application filed May 6, 1918. Serial No. 232,902.

*To all whom it may concern:*

Be it known that I, JAMES B. PIERCE, Jr., a citizen of the United States, residing at Charleston, in the county of Kanawha and State of West Virginia, have invented certain new and useful Improvements in Processes of Producing Barium Oxid, of which the following is a specification.

My invention relates to a process of producing from barium carbonate, barium oxid, suitable for oxidation into high test barium peroxid.

It is well known, that barium oxid can be produced from barium carbonate, but the barium oxid thus produced is not capable of being oxidized into barium peroxid of high test, to wit, over 88 per cent. $BaO_2$.

As a result of this inability of the barium oxid produced by the well known processes, to be converted into a high test barium peroxid, the barium oxid produced at the present time is generally made from barium nitrate.

In accordance with prior processes, it has been customary to mix barium carbonate with carbon or other reducing agent, and then heat the mass to a temperature varying from 1000° C. to 1200° C. It was heretofore customary to heat the mass in a hermetically sealed crucible, and this heating was carried out in an atmosphere of carbon monoxid. In some cases, the barium carbonate and carbon or other reducing agent were made into briquets. It was also necessary to withdraw the gases as formed from the sealed crucible or reaction chamber and this withdrawal of gases was continued to the point of creating a vacuum. It was also customary to mix other ingredients with the barium carbonate and carbon, such as barium nitrate, calcium oxid, barium peroxid, etc.

The above referred to processes have not proven wholly satisfactory, inasmuch as the barium oxid obtained is not porous, and is accordingly incapable of oxidation into barium peroxid of a high test, to wit, over 88 per cent. $BaO_2$. Barium oxid obtained by the processes above referred to is a hard, extremely dense mass, incapable of oxidation, or capable of oxidation to only a slight extent.

This hard and extremely dense character of the barium oxid thus obtained is due to the formation of a fusible basic barium carbonate. The fusing point of barium carbonate is 1380° C. and its decomposition into barium oxid may be effected in the presence of glowing carbon at a temperature of about 1150° C. There is produced in this process, a double compound, probably having the approximate composition $BaO.BaCO_3$. This compound is the fusible basic barium carbonate above referred to, and it has a fusing point below 1050° C. It is thus seen that the basic barium carbonate ($BaO.BaCO_3$) will fuse before or during the decomposition of the barium carbonate into barium oxid and carbon dioxid.

Furthermore, it has heretofore been impossible, in operating under commercial units, to have the barium carbonate and carbon absolutely dry, there results within the crucible water vapor, which in turn causes the formation of another compound, having approximately the composition $Ba(OH)_2.BaCO_3$, whose fusing point is slightly lower than that of the basic barium carbonate. The fusing point of the last named composition is about 950° C. to 1000° C.

As a result of the practice of the process above referred to, wherein the barium carbonate is heated in the presence of carbon, particles of unburned carbon or other reducing agent, remain disseminated throughout the mass of barium oxid produced. These particles of carbon are inclosed and coated over by the fused or semi-fused reaction mass, which prevents the carbon from either reacting with the oxygen of the barium carbonate, or burning to carbon monoxid or carbon dioxid, by contacting with the hot atmosphere of the crucible. The presence of the fine particles of carbon in the barum oxid produced, effects two marked disadvantages. During the oxidation process of the barium oxid, to produce the barium peroxid, the carbon should be largely converted into carbon dioxid, if a high test barium peroxid is to result. However, this carbon dioxid reacts with the unoxidized barium oxid, reverting it to the barium carbonate. Secondly, the carbon particles which do not react in this way, remain in the barium oxid, thereby imparting to it a gray color. This color persists through the blanc fixe when the barium peroxid is used, in the manufacture of hydrogen peroxid. It is obvious that the presence of the carbon particles, in the barium oxid is a serious drawback.

When the mixture of barium carbonate and carbon are heated as above indicated, the burning or oxidation of the carbon, or other reducing agent, takes place over the outer surface or wall of the mass, toward the center thereof. It is found if the reaction crucible be opened and the mass of barium carbonate and carbon examined, after said mass has been heated for only a short time, and before the temperature has risen to the point where the barium oxid is produced, that in the outer walls or surface of the mass, and extending into the mass for a substantial depth, the carbon will have burned away, leaving only barium carbonate. This will be the case whether the reaction mass of barium carbonate and carbon be charged into a cold reaction retort or a retort heated to any degree up to and including the temperature of the reaction. The reaction mass will therefore consist of two compositions, to wit, barium carbonate, and a mixture of barium carbonate and carbon. When the reaction temperature required for the formation of barium oxid from barium carbonate in the presence of glowing carbon, is reached, the barium oxid will be formed from the composition containing the barium carbonate and carbon. This barium oxid thus produced will react with the barium carbonate present upon the outer portion of the mass but being free from carbon, thereby forming basic barium carbonate, $BaO.BaCO_3$. This basic barium carbonate fuses at a low temperature, as above indicated.

The presence of strontium carbonate in all commercial barium carbonate, further prevents the production of barium oxid capable of oxidation into a high test barium peroxid. The effect of the strontium carbonate, in the production of barium oxid from heating barium carbonate in the presence of carbon, is to form an easily fusible compound, probably of the composition $SrO.BaCO_3$. This composition is formed, as strontium carbonate decomposes in the presence of glowing carbon at about 1050°C., forming $SrO.BaCO_3$. It requires a further 150° C. of temperature, to wit, 1200° C. to effect the decomposition of the barium carbonate.

An important object of my invention is to produce from barium carbonate porous barium oxid, capable of oxidation into a high test barium peroxid.

In the accompanying drawings, forming a part of this specification and in which like numerals are employed to designate like parts throughout the same, Figure 1 is an end elevation of an apparatus employed in the practice of my process, and Fig. 2 is a vertical longitudinal section taken on line 2—2 of Fig. 1.

In the drawings, the numeral 5 designates the outer casing of the furnace, which may be formed of iron, and is preferably cylindrical. This casing is lined with refractory material 5'. The casing 5 is provided at its opposite ends with annular flanges 6, to which are bolted, as shown at 7, heads or ends 8 and 9. The heads are provided centrally thereof with openings 10, covered by doors 11, which are clamped or bolted to the heads, as shown at 12. These doors engage copper packing 13, thereby forming a gas tight joint.

The numeral 14 designates a reaction chamber or muffle, preferably arranged concentric within the casing 5. The reaction chamber 14 has its forward end open while its opposite end is closed by a head 15. This reaction chamber is formed of refractory material. Surrounding the reaction chamber 14 in spaced concentric relation is an outer cylindrical casing 16, formed of refractory material. A ring 17 of refractory material, is arranged between the forward ends of the reaction chamber 14 and casing 16, while a head 18 of refractory material is arranged within the opposite end of the casing 16, as shown.

The numeral 19 designates current distributing rings arranged between the reaction chamber 14 and casing 16, and preferably formed of graphite. Connected with the current distributing rings 19 are electrodes 20, preferably formed of graphite and extending through openings 21 formed in the heads 8 and 9, but having no electrical contact therewith. The electrodes 20 pass through stuffing-boxes 22, formed of insulating material, which also afford a gas tight joint. The electrodes 20 are, of course, connected with the opposite poles of a source of current. The numeral 23 designates an annular resistor confined between the reaction chamber 14 and the casing 16, and contacting at its opposite ends with the current distributing rings 19. This resistor is preferably formed of granular carbon or other suitable material, and the same preferably has the same density throughout its mass thereby insuring a uniform heating of the reaction chamber.

Leading into the outer casing 5 is a pipe 24, having a transverse pipe 25 connected therewith. The pipe 25 has ends 26 and 27. The end 26 is adapted, for connection with a pressure pump, to supply compressed gases into the casing 5, while the end 27 is adapted for connection with a vacuum pump to withdraw gases from within the casing 5 and create a substantial degree of vacuum therein. Valves 28 and 29 are connected in the pipe 25, inwardly of the ends 26 and 27.

In the practice of my process, in connection with the apparatus herewith shown and described, the reaction chamber 14 is first heated to a temperature of about 1000° C.

but not exceeding the same, at which temperature it is charged with the barium carbonate, which is preferably of a pure variety. After the reaction chamber 13 is thus charged, the door 11 in the head 8 is returned to its closed position to form a gas tight union with the head 8. This heating operation is continued until the charge of barium carbonate reaches a temperature of approximately 1000° C., at which time the casing 5 is evacuated, preferably to 25 or 26 inches of mercury. This is effected by opening the valve 29 with the vacuum pump in operation. This evacuation is continued for a few minutes, about five to ten minutes, until the small amount of water or moisture, which is always present in barium carbonate and retained by it until heated to a red heat, has been expelled from the barium carbonate and withdrawn from its presence and from the furnace. The valve 29 is now closed, and the valve 28 is opened, in order that a change of carbon dioxid or a gaseous mixture containing carbon dioxid, nitrogen and oxygen is supplied into the casing 5, through the valve 28, and under pressure. The gas or gases fed into the casing 5 and subsequently into the reaction chamber 14 is under sufficient pressure to prevent the decomposition of any strontium carbonate which is present in the barium carbonate, at the temperature of 1300° C. It has been found that about ten pounds to the square inch is a suitable pressure for this purpose. The current is now continued through the resistor 23 until a temperature of 1250° C. to 1300° C. is reached, when the furnace is evacuated as rapidly as possible, which is accomplished by closing the valve 28 and opening the valve 29. As high a degree of vacuum is produced in the casing 5 as possible, preferably from one to two inches of mercury, or approaching the zero absolute as much as possible. This vacuum is maintained during the decomposition of the barium carbonate.

With the barium carbonate heated within the furnace to a temperature of 1250° C. to 1300° C. and subjected to the action of a high degree of vacuum, as above stated, the barium carbonate will decompose into barium oxid and carbon dioxid according to the following reaction:

$$BaCO_3 = BaO + CO_2.$$

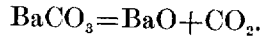

The decomposition of the strontium carbonate is prevented in the preliminary stages of the heating (1000° C. to 1200° C.) by maintaining within the reaction chamber a partial pressure of carbon dioxid sufficient to prevent the decomposition of strontium carbonate at 1250° C. When the temperature of 1250° C. is reached the chamber is rapidly evacuated to as near zero absolute as possible. When this is done both the barium carbonate and strontium carbonate decompose simultaneously, but under the above conditions of temperature and pressure, the velocity of the reaction of decomposition of barium carbonate into barium oxid and carbon dioxid is sufficiently great and approaches sufficiently the reaction velocity of the decomposition of strontium carbonate into strontium oxid and carbon dioxid that the decomposition of both barium carbonate and strontium carbonate is simultaneous through the mass thus affording no opportunity for interaction between any of the constituents within the mass which would lead to the formation of fusible compounds as set forth in the specification.

By the employment of the particular furnace the mass of barium carbonate is uniformly heated throughout, whereby the basic barium carbonate is not produced. The velocity of the reaction, under the conditions of temperature and pressure specified, is sufficiently rapid to prevent the formation of fusible compounds. I am thereby able to produce a porous barium oxid, capable of oxidation into a high test barium peroxid.

It is to be understood that the form of my invention herewith shown and described is to be taken as a preferred example of the same and that various changes may be resorted to in the steps of the process without departing from the spirit of the invention or the scope of the subjoined claims.

Having thus described my invention, I claim:

1. The herein described process of producing a porous barium oxid capable of oxidization into a high test barium peroxid, which consists in heating a mass of barium carbonate in the presence of a suitable degree of vacuum to separate out the water contained therein from the barium carbonate, subjecting the barium carbonate thus treated to the action of a gaseous pressure exceeding atmospheric pressure while increasing the degree of heat applied thereto until the reaction temperature of the barium carbonate is approached, and subjecting the barium carbonate while heated to the reaction temperature to a substantial degree of vacuum whereby the barium carbonate is decomposed into barium oxid and carbon dioxid.

2. The herein described process of producing a porous barium oxid capable of oxidization into a high test barium peroxid, which consists in heating commercial barium carbonate containing strontium carbonate in the presence of a suitable degree of vacuum to separate out the water therefrom, subjecting the mass thus treated to the action of a gaseous pressure at a suitable degree to prevent the decomposition of the strontium carbonate when the temperature of the mass is raised to approach the decomposition temperature of the barium carbonate, increasing the degree of heat applied to the mass while subjected to the gaseous pressure until the reaction temperature of the barium carbonate is approached, and suddenly subjecting the mass while being maintained at the reacting temperature of the barium carbonate to the action of a high degree of vacuum.

3. The herein described process of producing porous barium oxid capable of oxidization into a high test barium peroxid, which consists in treating commercial barium carbonate containing strontium carbonate and water to remove therefrom all substantial traces of water, heating the mass to the reaction temperature of the barium carbonate while subjecting it to the action of gaseous pressure for preventing the decomposition of the strontium carbonate prior to the decomposition of the barium carbonate, and subjecting the mass to the action of a substantial degree of vacuum when the reaction temperature of the barium carbonate is approached.

4. The herein described process of producing a porous barium oxid capable of oxidization into a high test barium peroxid, which comprises as a subcombination, the heating of commercial barium carbonate to the reaction temperature in the presence of a substantially high degree of vacuum and in the absence of a reducing agent.

5. The herein described process of producing a porous barium oxid capable of oxidization into a high test barium peroxid, which comprises as a subcombination, the heating of barium carbonate free from a reducing agent and in the presence of a substantial degree of vacuum to a reaction temperature.

6. The herein described process of producing barium oxid from barium carbonate, which consists in heating the barium carbonate free from a reducing agent to a reaction temperature in the presence of a high degree of vacuum.

7. The herein described process of producing barium oxid from barium carbonate, which consists in removing from the barium carbonate all substantial traces of water, and heating the barium carbonate free from a reducing agent to a reaction temperature in the presence of a high degree of vacuum.

8. The herein described process of producing barium oxid from barium carbonate, which consists in heating the barium carbonate containing strontium carbonate to a reaction temperature of the barium carbonate and preventing the decomposition of the strontium carbonate, and then rapidly effecting the decomposition of barium carbonate for producing the barium oxid without the formation of any fusible compounds.

In testimony whereof I affix my signature in presence of two witnesses.

JAMES B. PIERCE, Jr.

Witnesses:
HENRY WALKER,
HUGH G. NICHOLSON.